Figure 8:
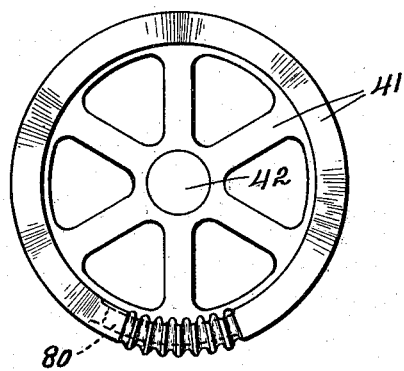

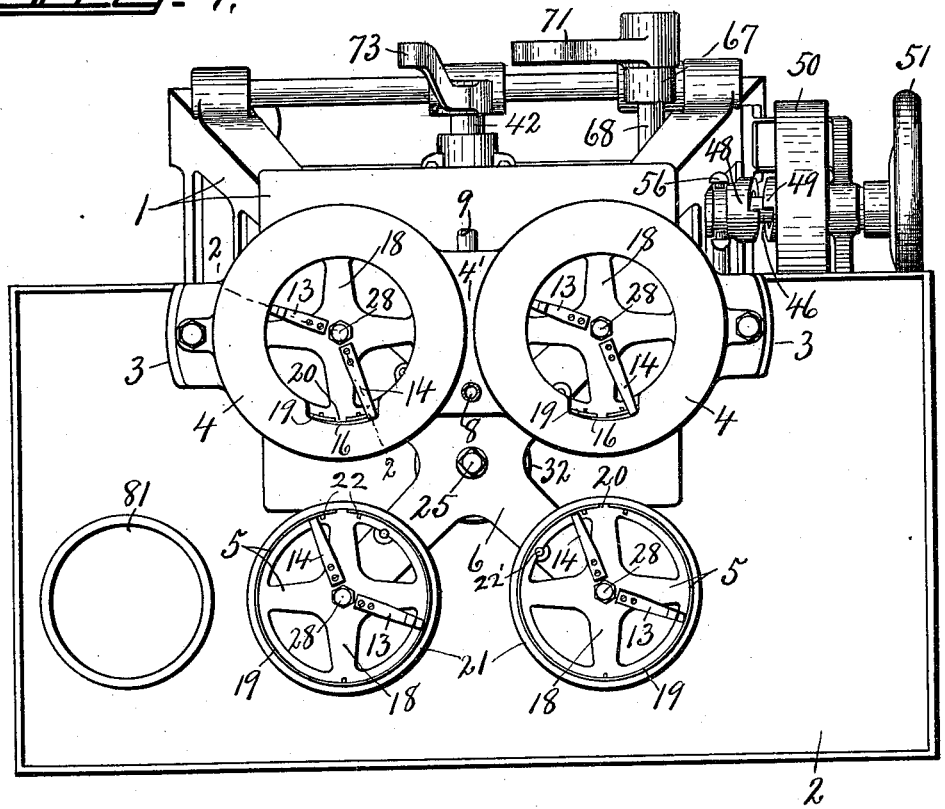

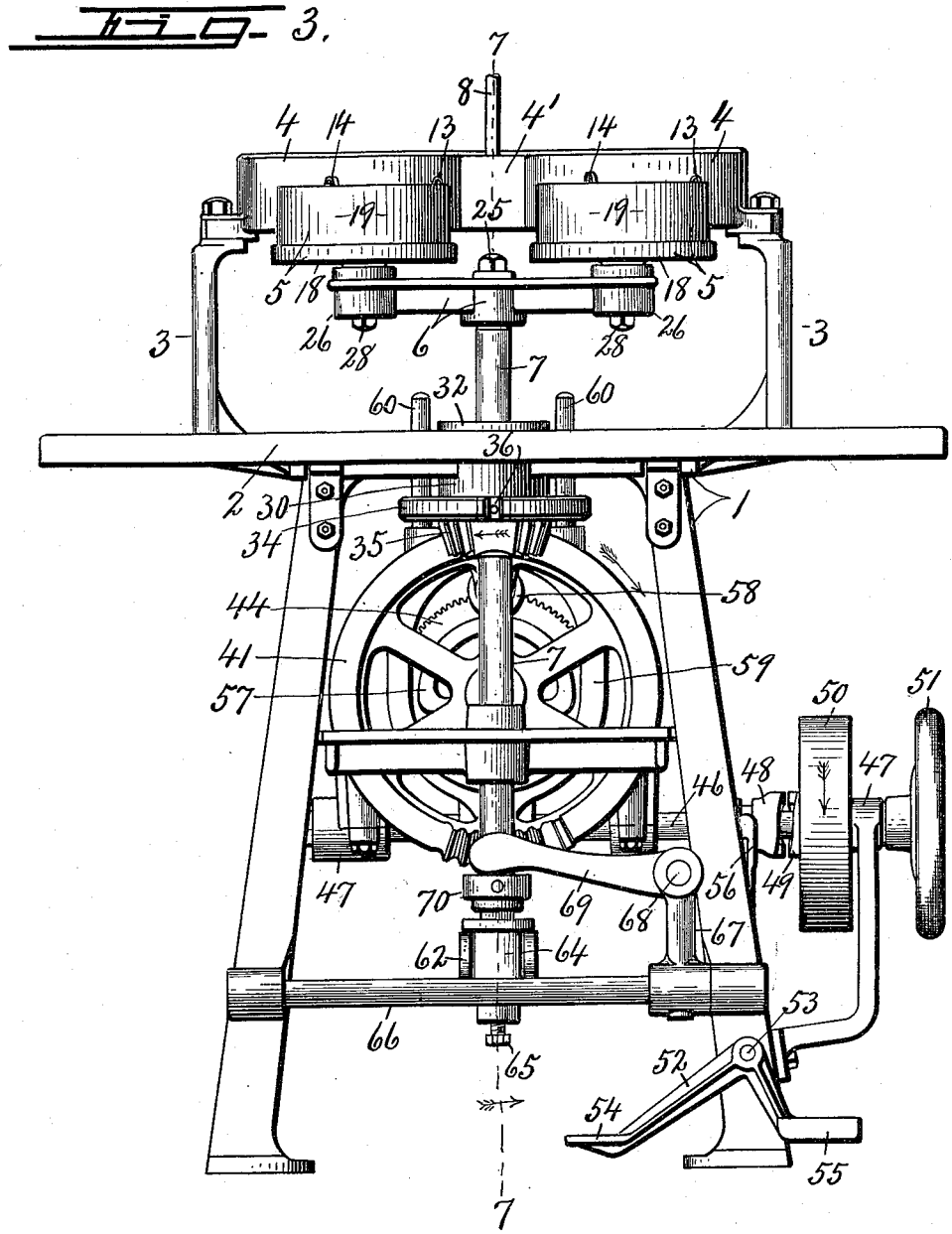

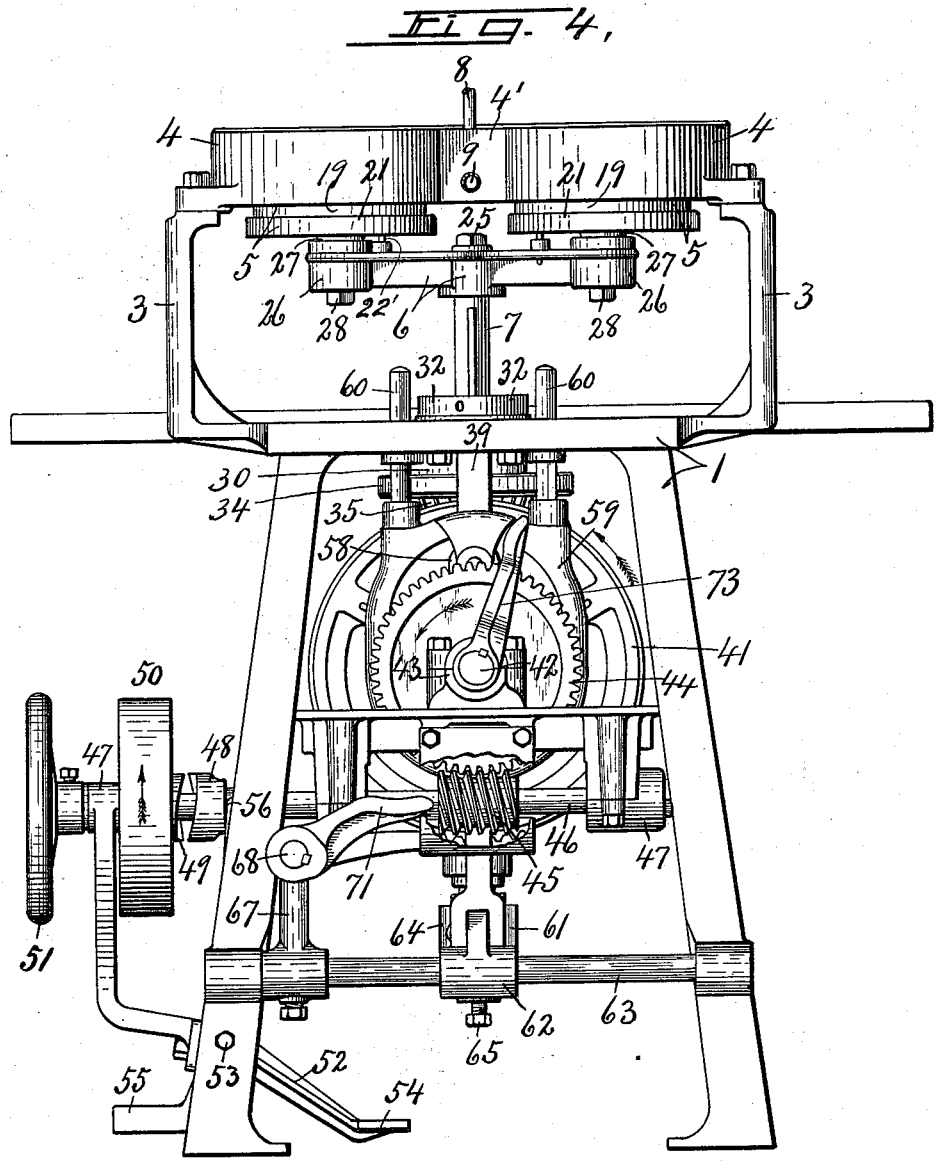

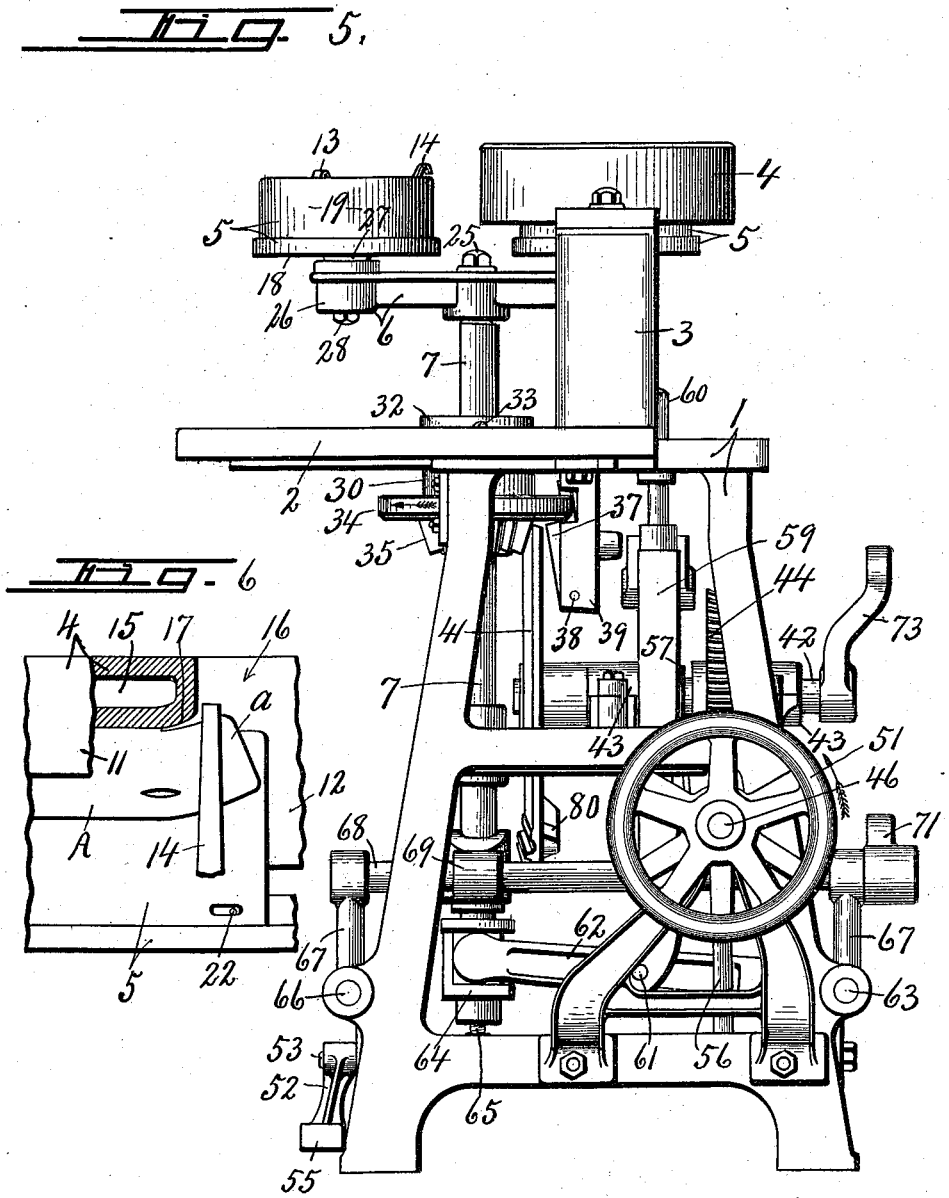

J. J. SELTENREICH.
COLLAR FORMING MACHINE.
APPLICATION FILED MAR. 29, 1912.
1,157,329.
Patented Oct. 19, 1915.
6 SHEETS—SHEET 5.
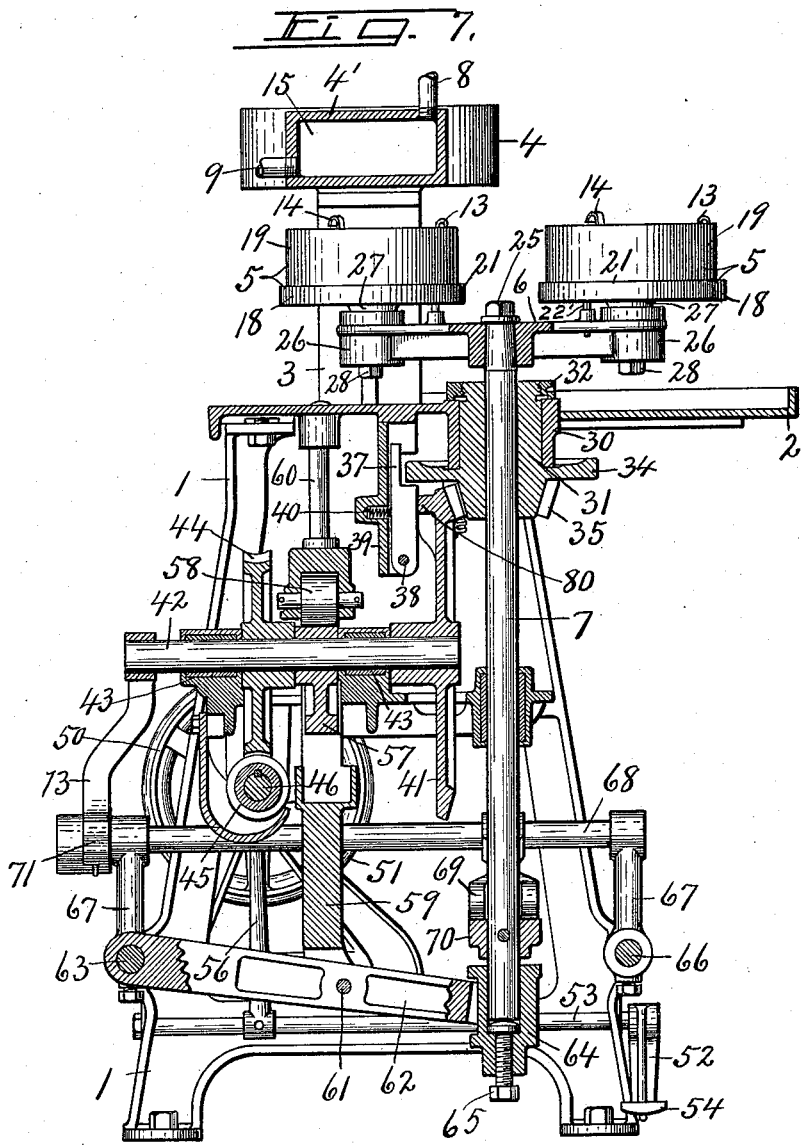

J. J. SELTENREICH.
COLLAR FORMING MACHINE.
APPLICATION FILED MAR. 29, 1912.

1,157,329.

Patented Oct. 19, 1915.
6 SHEETS—SHEET 6.

WITNESSES

INVENTOR.
J. J. Seltenreich
BY Howard P. Denton
ATTORNEY

UNITED STATES PATENT OFFICE.

JOHN J. SELTENREICH, OF CHICAGO, ILLINOIS, ASSIGNOR TO NATIONAL CHEMICAL COMPANY, OF SYRACUSE, NEW YORK, A CORPORATION OF NEW YORK.

COLLAR-FORMING MACHINE.

1,157,329.   Specification of Letters Patent.   Patented Oct. 19, 1915.

Application filed March 29, 1912. Serial No. 687,153.

*To all whom it may concern:*

Be it known that I, JOHN J. SELTENREICH, of Chicago, in the county of Cook, in the State of Illinois, have invented new and useful Improvements in Collar-Forming Machines, of which the following, taken in connection with the accompanying drawings, is a full, clear, and exact description.

This invention relates to certain improvements in collar ironing machines of the class set forth in the pending application of W. J. Quinn, Serial No. 609,415, filed February 18, 1911, in which the folded collars are placed by hand upon one or more circular forms which are then automatically shifted and brought into pressing coaction with steam heated dies for shaping the collar and ironing or smoothing its folded edge to remove any roughness, wrinkles or other irregularities in such fold or adjacent portions of the collar and I am aware of the application of Wilbur W. Quinn, Serial No. 627,500, filed May 16, 1911, and no claim is made herein to the invention or inventions disclosed in either of the above identified applications.

The main object of my present invention is not only to render the operation of ironing and shaping the collar as nearly automatic as may be practicable but also to provide means whereby the machine may be easily and quickly stopped and started by the mere pressure of the foot upon a suitable pedal lever and to otherwise increase the general efficiency of the machine so that it may be capable of doing more and better work for a given period of time and with less requisite skill than has heretofore been practiced. These collar supporting forms are mounted upon the head of an upright shaft some distance from the axis thereof, said shaft being rotatable intermittingly to bring the forms into registration with the ironing die and is then reciprocated axially to force the forms to and from their pressing positions, and one of the specific objects is to automatically lock the shaft against rotation during such reciprocatory movement so as to hold the forms in exact alinement with the dies during the pressing operation and to automatically release said shaft from its locked position after the forms have been withdrawn from the die.

Another object is to provide precautionary means for positively returning the shaft and forms from their pressing positions in case they should not return by their own gravity at the proper time.

A still further object is to provide the grooved ironing device with recesses communicating with one side of their respective grooves to receive the upturned ends or tabs of the collar and thereby prevent overturning of the upper edge of said tabs while under pressure in the dies.

Another object is to provide each ironing die with suitable spring fingers for retaining the collar on the form while the latter is being forced to and from its pressing position.

Other objects and uses relating to specific parts of the machine will be brought out in the following description.

Figure 9:
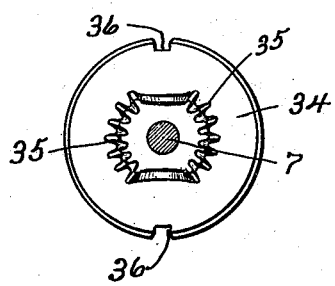
Figure 10:
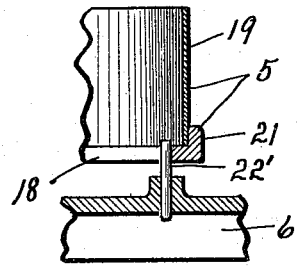

In the drawings Figure 1 is a top plan of a collar shaping and ironing machine embodying the various features of my invention. Fig. 2 is an enlarged vertical sectional view through one of the ironing dies and collar supporting forms together with the adjacent portion of the supporting head for said form taken on line 2—2, Fig. 1, the parts being shown in their pressed position with an interposed collar between the die and form and also showing the spring fingers for retaining the collar upon the form, while the latter is being forced to and from its pressing position. Figs. 3, 4 and 5 are respectively a front elevation, a rear elevation and a side elevation of the same machine. Fig. 6 is an enlarged inner face view partly in section of portions of one of the dies and one of the collar supporting forms in its pressing position showing the adjacent portion of a collar and recesses for receiving the upturned end of the tab and also showing a portion of one of the spring fingers for holding said tab on the form. Fig. 7 is a central vertical sectional view of the same machine taken on line 7—7, Fig. 3, except that the collar supporting forms are withdrawn from the dies and the operating mechanism is shown in a position for rotating the forms. Fig. 8 is a face view of the larger mutilated gear for driving the rotary carrier. Fig. 9 is an inverted face view of the smaller mutilated gear and notched disk integral therewith. Fig. 10 is an enlarged detail sectional view of the locking connection between the base of one of the collar supports and adjacent portion of the carrier.

This machine comprises an upright supporting frame —1— upon which is mounted a work table —2— and upright brackets —3— rising from the table for supporting a plurality of, in this instance two, ironing heads or dies —4— leaving sufficient space between the table —2— and dies and also between the brackets —3— for the free reciprocatory and rotary movement of a plurality of, in this instance two, pairs of collar supporting forms —5— and their supporting frame —6— which latter is mounted upon a vertically movable rotary shaft —7—. The dies —4— are substantial duplicates disposed side by side in the same horizontal plane and preferably consist of hollow cast metal rings having adjacent sides integrally united by a hollow web —4'— to which steam or other heating fluid may be supplied from any available source through a supply pipe —8— for heating the head to the desired temperature and when steam is employed as the heating medium, I also provide the hollow web with a drainage outlet —9— as shown more clearly in Figs. 1 and 4. Each of the dies —4— is provided in its underside with an annular collar shaping groove —10— concentric with the axis of said die and forming inner and outer flanges —11— and —12—, the inner flange —11— which engages the inner side of the collar being somewhat shorter vertically than the flange —12— to allow the use of suitable spring fingers —13— and —14— for retaining the collar on the form during its entrance and exit into and out of the groove —10—. For a similar purpose the adjacent sides of the flanges —11— and —12— are tapering or flaring downwardly or rather converge toward the base of the groove which is rounding in cross section so as to impart a similar rounding contour to the fold of the collar during the pressing operation.

As previously stated each of the dies or rings —4— is hollow to form an annular steam chamber —15— which extends radially over and beyond the base of the groove —10— and downwardly in the flange —12— some distance below the lower edge of the flange —11— leaving comparatively thin yet rigid intervening walls between the groove and chamber for quickly heating the base and sides of the groove.

As best seen in Figs 1, 2 and 6, a relatively small portion of the inner side of each of the dies or rings —4— and flange —11— is cut away to form a vertical recess —16— leading upwardly and laterally from the base of the groove —10— to receive the upturned ends or tabs —a— of a collar —A— and also to receive the upper end of one of the spring fingers as —14— which is secured to the collar support —5— and adapted to engage the upper edge of the tab —a— to hold the latter on the form —5— during its entrance into the groove of the die and to withdraw the collar when the form is withdrawn from its pressing position.

As shown more clearly in Fig. 6, the end of the upper wall or base of the groove adjacent the recess —16— is curved upwardly at —17— to allow the upturned tab of the collar to readily enter the recess and to avoid overturning the upper edge of said tab, while the fold of the collar is being pressed against the base of the groove. The object in flaring the side walls of the groove —10— downwardly is to facilitate the entrance of the collar and its supporting form into said groove and at the same time to cause the collar to be wedged tightly therein to give the fold and adjacent portions of the collar the desired polish or finish. Each of the collar supporting forms —5— preferably comprises a cast metal base —18— and a circular sheet metal ring —19—, the latter being divided through one side at —20— to permit it to expand and contract or rather to yield radially at different points so as to compensate for any inequalities in the thickness of the collar and to more readily register with the sides and base of the groove during the operation of pressing the collar therein. The collar supporting ring —19— is preferably made of comparatively thin polished metal capable of imparting a smooth finish to the inner faces of the opposite folds of the collar and to shape said collar so that the opposite sides will be slightly separated to allow a tie to be readily drawn between the folds. The base —18— is provided with a circular marginal flange —21— within which the lower end of the collar supporting ring —19— is detachably fitted and held in place by one or more pins —22— projecting inwardly and radially from the flange —21— and adapted to enter suitable apertures in the adjacent portions of said ring, thereby permitting the ring to be detached from the base when necessary or desirable.

The spring fingers —13— and —14— are secured by a suitable fastening means as screws —23— to the base —18— and extend upwardly therefrom a sufficient distance to engage the collar when mounted upon the upper edge of the supporting ring —19—, the upper end of the spring finger —13— being bent outwardly and downwardly at —24— at an angle to the axis of the ring and is spring pressed into engagement with the inner fold of the collar to hold said collar in proper position on the form while the latter is being forced to its pressing position. The object of inclining the portion —24— of the upper end of the spring is to allow it to ride against the lower edge of the flange —11—, while the collar is being forced in the groove of the die, but as soon as the collar supporting form and collar thereon is withdrawn from the die, this inclined portion is immediately returned to its holding position to grip the collar and carry it down with the form. The upper end of the spring finger —14— is also returned outwardly and downwardly and adapted to engage with the upper edge of the tab —a— in the manner and for the purpose described.

The supporting frame —6— for the forms —5— is rigidly secured to the shaft —7— and for this purpose is provided with a central hub having a tapering opening therethrough fitted tightly upon a correspondingly tapered upper end of the shaft and held in place by a cap screw —25— which enters a threaded hole in the adjacent end of the shaft, said support being also provided with a series of, in this instance four, radial arms of equal length spaced uniform distances apart circumferentially and provided at their outer ends with sockets —26— for receiving the hubs as —27— of the ring supports —18—, the rings being locked by pins —22—.

The hubs —27— are preferably hollow and telescope with an easy sliding fit within the sockets —26— and are held in place against undue vertical displacement by bolts —28— passing through suitable apertures in the bottom of the sockets —26— and upper sides of the hubs —27—. Suitable coiled springs —29— are arranged within the sockets —26— and hubs —27— around their respective bolts —28— so as to bear against the bottom of the socket —26— and upper side of the hub —27— for yieldingly supporting the forms —5—, thereby causing the collars to be pressed into and against the bases of the grooves —10— under a yielding pressure and assuring a perfect contact of all portions of the fold of the collar with the base of the groove even though the thickness of the collar at the fold may vary slightly at different points.

The shaft —7— is supported in an upright position midway between and some distance in front of the dies —4— and is adapted to be rotated and moved axially to successively register each pair of collar supporting forms with the grooves in the dies and to move said forms with the collars thereon into and out of said grooves and for this purpose I have provided the top of the main supporting frame —1— with a hollow hub —30— in which is journaled a rotary sleeve —31— having a central bore in which the shaft —7— is splined for axial movement and for rotary movement with the sleeve. This sleeve —31— is inserted from the underside upwardly through the opening in the top of the frame —1— and extends some distance above said top, its upper end being threaded externally for receiving a nut —32— for engaging the upper side of the frame and holding the sleeve in operative position against downward movement, said nut being held in its adjusted position by one or more set screws —33—. The lower end of the sleeve —31— is provided with an enlarged integral disk —34— and mutilated bevel gear —35—, the disk —34— being engaged with the underside of the hub —30— and together with the nut —32— holds the sleeve against endwise movement in either direction and at the same time permits free rotation of the sleeve and shaft.

The disk —34— constitutes one of the locking elements for holding the sleeve and shaft against rotation when the collar supporting forms are in pressing coaction with the dies —4—, and inasmuch as each pair of forms are registered successively and alternately with the dies, it is necessary to lock the shaft against rotation at each half turn and for this purpose the periphery of the disk —34— is provided with diametrically opposite notches or recesses —36— one of which is shown in Fig. 3 for alternately and successively receiving a movable locking pawl or detent —37— shown more clearly in Fig. 5 as engaged in the other notch.

The pawl —37— is pivotally mounted at —38— in a bracket —39— secured to and depending from the underside of the top of the main supporting frame —1— at the rear side of the disk —34—, said bracket being provided with a vertical groove in which the pawl —37— is adapted to play and serves to hold said pawl against undue lateral movement. This pawl is spring pressed into holding engagement with the disk —34— by means of a coiled spring —40— which is mounted in a suitable socket in the bracket —39— and engages the rear edge of the pawl so as to force the latter forwardly toward the disk and at the same time permitting said pawl to be forced from its holding position at the proper time in a manner hereinafter described.

The bevel gear or pinion —35— is adapted to be driven by a mutilated gear —41— which is mounted upon a horizontal shaft —42—, said gear and pinion being proportioned and mutilated in such manner as to rotate the shaft intermittingly one-half revolution at a time and to hold the shaft —7— against rotation while the shaft —42— continues to revolve. For this purpose the ratio of the gears —35— and —41— is one to four, the gear —35— being provided with diametrically opposite toothed segments and intervening diametrically opposite smooth portions, while the gear —41— is provided with a toothed segment having about the same number of teeth as one of the segments of the gear —35— or sufficient so that when the toothed segment of the gear —41— is in mesh with either of the toothed segments on the gear —35—, it will rotate the shaft one-half revolution, the remaining portions of the gear —41— being smooth for sliding contact with the smooth portions of the gear —35—, thereby holding the shaft against rotation irrespective of the locking pawl —37—.

The shaft —42— is journaled in suitable bearings —43— on the main supporting frame —1— and is provided with a worm gear —44— which meshes with a worm —45— on a main driving shaft —46—. This shaft —46— is also journaled in suitable bearings —47— on the main supporting frame and is provided with a clutch section —48— splined thereon and movable into and out of engagement with a corresponding clutch section —49— on the adjacent end of a driving pulley —50— which is loose on the shaft and adapted to be connected to any available source of power not shown, said shaft —46— being also provided with a hand wheel —51— on its outer end whereby it may be rotated to operate the machine at will when necessary.

The sliding clutch section —48— is moved into and out of interlocking engagement with the pulley —50— by means of a bell-crank lever —52— which is secured to a rock shaft —53— and is provided with opposite pedals —54— and —55— for rocking the shaft in reverse directions. This rock shaft —53— is journaled in the main supporting frame and provided with an upwardly projecting arm —56— rigid thereon and having its upper end engaged in an annular groove in the clutch section —48— so that by rocking the lever —52— in one direction, as for example, by depressing the pedal —55—, the clutch member —48— will be thrown into locking engagement with the clutch section —49— to lock the pulley —50— to the shaft —46— or when rocked in the other direction by means of the pedal —54—, the clutch section —48— will be thrown from its locking position, thereby releasing the pulley and permitting it to rotate continuously independently of the machine.

The means for reciprocating the vertical shaft —7— and collar supporting forms —5— carried thereby consists of a semi-circular cam —57— rigidly secured to the shaft —42— and adapted to engage a roller bearing —58— on the underside of the top of a vertically movable yoke —59— which surrounds the cam —57— and shaft —42— and is provided with upwardly projecting guide pins —60— playing in suitable guide openings in the top of the main supporting frame —1— so as to cause the yoke to move vertically in a straight line, it being understood that the opening in the yoke —59— in which the cam —57— plays is of sufficient size to permit free play of the cam without liability of engaging any other portions of the yoke except the roller —58—.

The lower end of the yoke —59— is pivotally connected at —61— to the intermediate portion of a forwardly and rearwardly extending rock arm —62— having its rear end fulcrumed upon a cross rod —63— in the lower part of the main supporting frame —1— and its front end furcated and engaged between suitable shoulders of a collar —64— in which the lower end of the shaft is stepped, said collar having an axial adjusting screw —65— in its lower end upon which the lower end of the shaft rests for adjusting said shaft to the desired height relatively to the collar. At the front of the frame is another cross rod —66— disposed in substantially the same horizontal plane as the cross rod —63— and to these cross rods are rigidly secured upwardly projecting brackets —67— carrying a forwardly and rearwardly extending rock shaft —68— to which is secured one end of a laterally projecting rock arm —69— having its other end engaged with the upper face of a collar —70— rigid on the vertical shaft —7— for positively forcing the shaft downward in case it should fail to drop by its own gravity. For this purpose the rear end of the rock shaft —68— is provided with an additional rock arm —71— rigidly secured thereto and adapted to be engaged by a coacting arm —73— on the rear end of the horizontal shaft —42— as shown more clearly in Figs. 1, 4 and 5. It is now apparent that the arm —73— is mounted on the same shaft as the mutilated gear —41— and cam —57—. This cam —57— is adjusted relatively to the toothed segment on the gear —41— so that the central portion of its highest concentric surface contacting with the roller —58— of the yoke —59— is diametrically opposite said toothed segment and therefore elevates the shaft and collar supporting forms carried thereby into pressing coaction with the shaping heads —4—, while said shaft is held against rotation or through practically half a revolution of the gear —41—, such vertical movement of the shaft and collar forming heads being accomplished through the medium of the yoke —59— and its connection with the rock arm —62—.

As soon as the high portions of the cam have passed the roller —58— on the yoke —59— during its continuous revolution, the weight of the shaft and collar supporting forms mounted thereon is ordinarily sufficient to return said forms to a plane below that of the shaping heads —4— but in case these parts should not return to their starting positions by gravity, the arm —73— on the shaft —42— will have rotated into contact with the rock arm —71—, thereby operating the rock shaft —68— and rock arm —69— to positively depress the vertical shaft and collar supporting forms below the plane of the shaping heads —4— before the toothed segment of the gear —41— engages the teeth of the pinion —35— to rotate the vertical shaft and forms carried thereby for the purpose of bringing another set of such forms with the collars thereon into registration with the shaping heads preparatory to raising said forms to repeat the pressing operation previously described. During this operation of raising and lowering the collar supporting forms into and out of pressing coaction with the heads —4—, the shaft is positively held against rotation by the locking pawl —37— and it therefore becomes necessary to force this pawl from its locking position before the toothed segment of the gear —41— engages the teeth of the pinion —35— to rotate the shaft —7— and forms carried thereby and for this purpose I have provided the rear face of the gear —41— with a cam —80— extending concentrically across the back and beyond the ends of the toothed segment of the gear —41—, the ends of said cam being beveled so as to ride easily against the front face of the pawl —37— to force the latter rearwardly against the action of its retracting spring out of locking engagement with the disk —34—, thereby permitting the rotation of the shaft —7— and forms —5— by the intermeshing teeth of the gears —41— and —35—. After the collars are pressed, they are removed by hand from the forms —5— and placed into a circular chute —81— through which they may gravitate into an underlying receptacle not shown.

Operation: Assuming that the collar supporting forms are in their elevated positions as shown in Figs. 3, 4 and 5, in which one pair of forms are in pressing coaction with the heads —4— while the other pair are exposed to the front of the machine, the collars which have been previously folded are then placed by hand upon the upper edges of the forms —5—, while those which have been previously placed in the same manner upon the forms which are in pressing coaction with the heads are under pressure, ample time being afforded to place these collars on the exposed forms owing to the relatively slow intermitting action of the vertical shaft —7— and forms carried thereby. As previously stated, the forms which are in pressing coaction with the heads remain in this position during practically half of the period of revolution of the gear —41—, thereby affording ample time for shaping and drying the fold of the collar which has been previously moistened before being placed upon the forms. As soon as the high bearing surface of the cam —57— leaves the roller —58— of the yoke —59—, the vertical shaft —7— carrying the collar supporting forms is lowered sufficiently to bring said forms below the plane of the shaping heads —4— and immediately following this action, the toothed segment of the gear —41— engages the teeth of the gear —35— to rotate the shaft —7— one-half revolution, thereby bringing the ironed collars to the front of the heads and at the same time registering the forms with the unironed collars thereon with said heads. Immediately after the rotation of the heads in the manner just described, the shaft is locked against rotation by reason of the engagement of the pawl —37— in one of the notches —36— of the disk —34—, whereupon the return of the cam —57— will elevate the shaft —7— and forms —5— through the medium of the yoke —59— and rock arm —62— thereby bringing the registering pair of collar supporting forms into pressing coaction with the shaping heads —4—. During this pressing operation, the operator removes the ironed collars from the exposed forms —5— and replaces unironed collars thereon ready for repetition of the operations previously described. If, for any reason it becomes necessary to stop the machine, it may be done by simply depressing the pedal —54— of the lever —52—, thereby throwing the clutch —48— out of locking connection with the pulley —50— and when the clutch is thus disconnected, the machine may be operated manually by means of the hand wheel —51—. Cross reference is hereby made to my pending applications No. 665,006 filed December 11, 1911, and No. 666,485 filed December 18, 1911. It will be observed upon reference to Figs. 1 and 4 that the collar supports are held against rotation in their respective sockets —26— by pins, as —22'— which are secured to the arms of the carrier —6— and project into recesses in the overlying portions of the base —18—, thereby assuring the registration of the tabs of the collars with the recesses —16— in the heads, it being understood that the meeting ends of the sheet metal collar-supporting rings —19— are adjusted to register with said recesses and also serve as a guide in placing the collars upon the rings with their meeting ends at opposite sides of the division —20—.

What I claim is:

1. In a collar-ironing machine, a head having a circular groove in its under side, a rotary carrier having a socket, a coil spring seated in the socket and movable therewith into and out of axial alinement with the groove in the head, a circular collar support centrally mounted on said spring, and having a hollow boss surrounding the spring and telescoping in said socket, and a connecting bolt between the carrier and collar support.

2. In a machine for shaping and ironing folded collars, a pair of shaping heads having circular grooves in their undersides, a rotary and auxiliary movable shaft, a frame secured to the upper end of said shaft and provided with separate pairs of sockets spaced equi-distant from the axis of the shaft, collar supporting forms having hollow hubs telescoping in said sockets, coiled springs in said sockets, and hubs for yieldingly supporting the forms, means for rotating the shaft intermittingly to bring each pair of forms successively into registration with the shaping heads, and separate means for moving the shaft axially to force the registering forms into and out of pressing coaction with the heads.

3. In a collar-ironing machine, a shaping head having a circular groove in its under side and a collar support movable into and out of the groove and comprising a base having an inwardly projecting radial pin and a circular sheet metal ring divided through one side and having one of its ends provided with an aperture receiving said pin for holding the ring against relative rotation on its base and permitting said ring to be removed by springing the slotted end inwardly out of engagement with the pin.

4. In a machine for shaping and ironing folded collars, a shaping head having a circular groove in its underside forming inner and outer circular flanges, a portion of the inner flange being cut away to form a recess registering with the groove the outer flange being continuous, a collar supporting form, means for moving the form into and out of pressing coaction with the groove of the head, and a spring finger within the form spring pressed into engagement with the inner fold of the collar to hold the latter on the form, said finger registering with the recess in the head when the form is forced to its pressing position.

5. In a collar-ironing machine, a shaping head having a circular groove in its underside forming inner and outer flanges, a portion of the inner flange being cut away to form a recess for receiving the collar tabs, a circular collar support and a carrier therefor having telescoping connections, a coil spring within said telescoping connections yieldingly supporting the collar support on the carrier, means for moving the carrier rotarily about an axis at one side of the axis of the groove, additional means for reciprocating the carrier, and separate means for holding the collar support against rotary movement relatively to the carrier so as to register a certain portion of the collar support with the recess in the head when the collar support is registered with the circular groove.

6. In a machine for shaping and ironing folded collars, a collar shaping die having a circular groove in its underside, a circular collar supporting form, power-driven means for elevating the form into pressing co-action with the groove in the die, and additional power-driven means synchronized with the first named means for positively returning the form from its pressing position.

7. In a collar ironing machine, two co-acting pressing elements, one of which is movable toward and from the other, means for reciprocating the movable element comprising a rotary cam for forcing the movable element to its pressing position, power driving means for rotating said cam, a rock arm for returning the movable element from its pressing position, and power driven means separate from but moving in synchronism with the cam for rocking said arm.

8. In a machine for shaping and ironing collars, a collar shaping die having a groove in its underside, a rotary vertical shaft supported some distance to one side of the die, a form supporting frame secured to the shaft, separate circular collar supporting forms mounted on the frame a distance from the axis of the shaft equal to the distance between said axis and that of the die, means for rotating the shaft intermittingly to move the forms successively into registration with the groove in the die, means for locking the shaft against rotation when one of the forms is registered with the groove, means for moving the shaft endwise to force the registering form into pressing co-action with the groove in the die, additional means for positively returning the shaft and forms to their down position, and separate means synchronized with the action of the mechanisms for rotating and reciprocating the shaft for tripping the locking means.

9. In a collar molding machine, the combination of a head having a socket, a ring for receiving the collar, the head and the ring having relative movement one toward and from the other for interfitting the ring with the collar thereon and the socket to mold the collar, and means for holding the collar on the ring and preventing the same form adhering to the head, the head having means for disengaging the collar holding means from the collar during the molding operation, substantially as and for the purpose set forth.

10. In a collar molding machine, the combination of a head having a socket, a ring for receiving the collar, the head and the ring having relative movement one toward and from the other for interfitting the ring with the collar thereon and the socket to mold the collar, and means for holding the collar on the ring and preventing the same from adhering to the head, said means comprising a spring arm fixed relatively to the ring, the head having means for moving the spring arm out of operative position during the molding operation, substantially as and for the purpose described.

11. In a collar ironing machine, a collar shaping head having an annular groove therein, a frame movable toward and from the head and provided with a hub, a circular collar support having a hub telescoping with the hub of the frame, a spring within said hubs for yieldingly supporting the collar support, and a bolt passed through said hubs and spring for holding the collar support and frame in operative position and for tensioning the spring.

12. In a collar ironing machine, a collar shaping head, a frame movable toward and from the head and provided with a hub, a collar support having a hub telescoping with the hub of the frame, a spring within said hubs for yieldingly supporting the collar support, and means connecting the frame and collar support for holding said parts in operative position.

13. In a collar molding machine, the combination of a head having a socket, a ring for receiving a collar, one of said elements being movable toward and from the other for interfitting the ring with the collar thereon and the socket to mold the collar, a carriage for the ring including a cylindrical hub, the ring having a hollow hub telescoping with and slidable axially of the hub upon the carriage, a spring arranged within said hubs, said spring permitting the ring to yield relatively to the carriage when in interfitting relation with the head, and means for moving the carriage to bring the head and ring into interfitting relation.

14. In a collar molding machine, the combination of a head having a socket, a rotary carriage having a plurality of hollow hubs eccentrically positioned thereon, a plurality of rings for receiving collars, said rings having hollow hubs telescoping with and slidable axially of respective hubs upon the carriage, a spring arranged within each of said telescoping hubs, said springs permitting the rings to yield relatively to the carriage and independently of each other, and means for moving the carriage axially to bring the rings with the collars thereon into interfitting relation with the socket in the head to mold the collar.

15. In a collar molding machine, the combination of a head having a socket, a ring for receiving the collar, the ring being movable toward and from the head for interfitting the ring with the collar thereon and the socket to mold the collar, a carriage for the ring including a hollow hub, the ring having a hollow hub telescoping with and slidable axially of the hub upon the carriage, a spindle extending axially through the telescoping hubs and having spaced apart shoulders engaging a lower face of the carriage and an upper face of the hub, a spring interposed between the carriage and the hub of the ring for permitting the ring to yield relatively to the carriage when in interfitting relation with the head, and means for bringing the head and ring into interfitting relation.

16. In a collar molding machine, a shaping head having a socket, a collar supporting ring, one of said elements adapted for movement toward and from the other for interfitting the ring and collar supported thereon with the socket to mold the collar, a carriage for the ring, a vertically disposed pin, a yoke engaged with and guided vertically by said pin, a cam for moving the yoke vertically, said yoke in its vertical movement adapted to force the movable element into pressing coaction with its coacting element.

17. In a collar molding machine, a shaping head having a socket, a collar supporting ring, one of said elements adapted for movement toward and from the other for interfitting the ring and collar supported thereon with the socket to mold the collar, a carriage for the ring, a pair of vertically disposed substantially parallel guide pins, a yoke having its ends engaged with and guided vertically by said pins, means for moving the yoke vertically, said yoke in its vertical movement adapted to move the carriage for the ring to bring the ring supported thereon into pressing coaction with the head.

18. In a collar molding machine, a shaping head having a socket, a collar supporting ring, one of said elements adapted for movement toward and from the other for interfitting the ring and collar supported thereon with the socket to mold the collar, a carriage for the ring including a vertically disposed shaft, a sleeve upon said shaft and having an adjustable end-thrust bearing for the shaft whereby the pressure of the head and ring may be regulated, and actuating means for moving the sleeve and thereby the shaft vertically to bring the elements into pressing coaction.

In witness whereof I have hereunto set my hand on this 26th day of March, 1912.

JOHN J. SELTENREICH.

Witnesses:
H. E. CHASE,
E. S. TUCKER.